United States Patent

Skinner

[11] Patent Number: 5,150,927
[45] Date of Patent: Sep. 29, 1992

[54] EXPANDABLE SEAL ARRANGEMENT

[75] Inventor: William O. Skinner, Fort Wayne, Ind.

[73] Assignee: Press Seal Gasket Corporation, Forty Wayne, Ind.

[21] Appl. No.: 643,429

[22] Filed: Jan. 22, 1991

[51] Int. Cl.⁵ .......................................... F16L 21/00
[52] U.S. Cl. .......................................... 285/189; 285/4; 285/370; 285/236; 285/39; 285/64; 24/20 EE; 24/20 R; 277/1; 277/DIG. 2
[58] Field of Search ............. 285/189, 237, 236, 230, 285/370, 109, 162, 170, 196, 4, 39, 64; 24/20 R, 20 S, 20 EE; 277/1, DIG. 2

[56] References Cited

U.S. PATENT DOCUMENTS

| | | |
|---|---|---|
| 1,117,083 | 11/1914 | Patchell . |
| 1,211,692 | 1/1917 | Endebrock et al. . |
| 1,274,038 | 7/1918 | Hilker . |
| 1,359,596 | 11/1920 | Hill . |
| 1,768,392 | 6/1930 | Benien . |
| 3,293,978 | 12/1966 | Handley . |
| 3,406,988 | 10/1968 | Jones . |
| 3,449,916 | 6/1969 | Tabor . |
| 3,656,771 | 4/1972 | Stout . |
| 3,700,265 | 10/1972 | Dufour et al. . |
| 3,759,280 | 9/1973 | Swanson . |
| 3,808,937 | 5/1974 | Roehrig . |
| 3,813,116 | 5/1974 | Horsley ........................ 285/423 X |
| 3,814,409 | 6/1974 | Prasse . |
| 3,866,925 | 2/1975 | Maimstrom et al. . |
| 3,958,313 | 5/1976 | Rossborough . |
| 3,973,783 | 10/1976 | Skinner et al. . |
| 4,017,089 | 4/1977 | Kurata et al. . |
| 4,103,901 | 8/1978 | Ditcher . |
| 4,203,190 | 5/1980 | Temple et al. . |
| 4,215,868 | 8/1980 | Skinner et al. . |
| 4,242,164 | 12/1980 | Skinner . |
| 4,281,944 | 8/1981 | Bowman . |
| 4,387,900 | 6/1983 | Ditcher et al. ................... 277/101 |
| 4,466,219 | 8/1984 | Campolito ............................ 52/20 |
| 4,478,437 | 10/1984 | Skinner ............................ 285/189 |
| 4,582,450 | 4/1986 | Neil ...................................... 404/26 |
| 4,702,645 | 10/1987 | Skinner et al. ................... 405/154 |
| 4,711,455 | 12/1987 | Ditcher et al. ..................... 277/9.5 |
| 4,746,127 | 5/1988 | Westhoff et al. ..................... 277/1 |
| 4,864,684 | 9/1989 | Gellenthin, Jr. ................ 285/162 X |
| 4,903,970 | 2/1990 | Ditcher et al. ..................... 277/9.5 |

Primary Examiner—Randolph A. Reese
Assistant Examiner—Timothy Aberle
Attorney, Agent, or Firm—Barnes & Thornburg

[57] ABSTRACT

An arrangement for radially expanding a tubular gasket includes a sliding sleeve and a compression sleeve. The sliding sleeve is formed of a thin membrane of relatively rigid material, such as nylon, hypalon or polyester. The sliding sleeve is positioned adjacent an inner surface of that portion of the tubular gasket to be expanded. The compression sleeve is disposed immediately adjacent the sliding sleeve such that the sliding sleeve serves as a slip plate for the compression sleeve when the sleeves are expanded against the inner surface of the tubular gasket. The sliding sleeve may be attached to or integrally molded into the inner surface of the tubular gasket. Another aspect of the invention involves forming the compression sleeve so as to allow it to be locked in any one of a plurality of expanded positions. The locking mechanism may be integrally formed with the compression sleeve, or may be formed as a separate element which may be molded into, or otherwise pre-attached to, the inner surface of the tubular gasket.

18 Claims, 2 Drawing Sheets

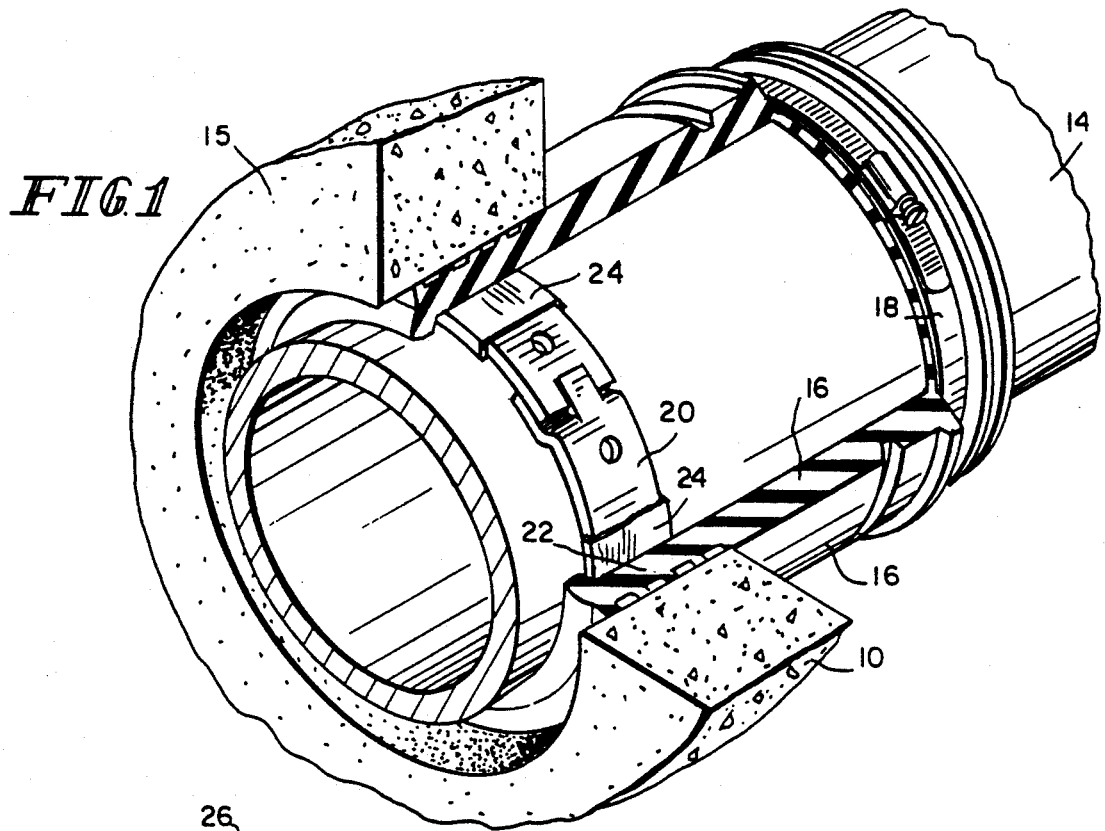
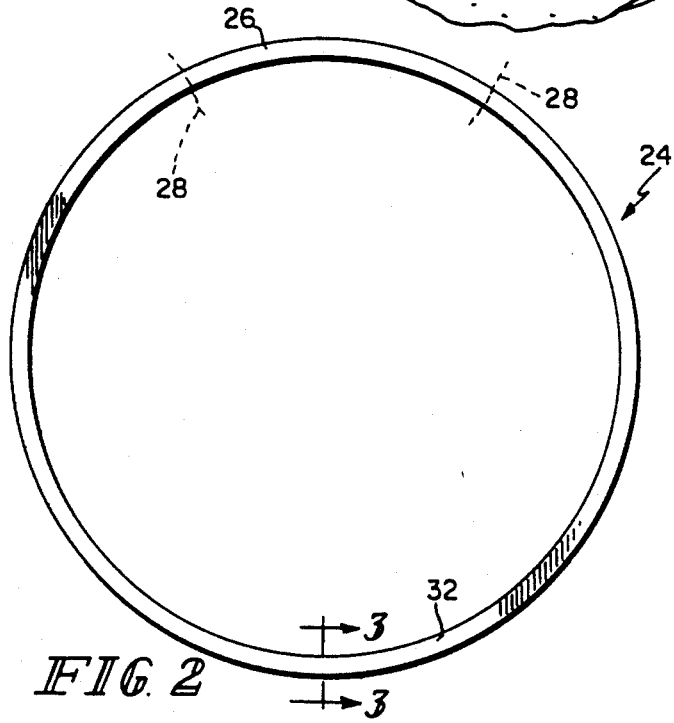
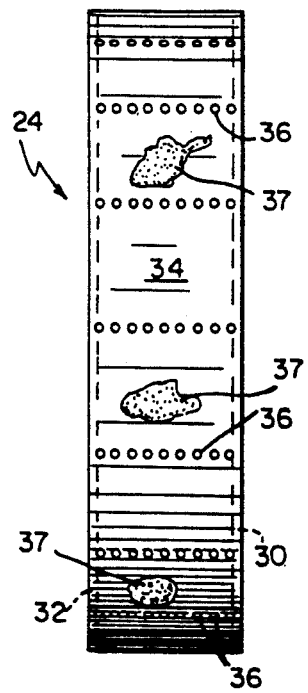
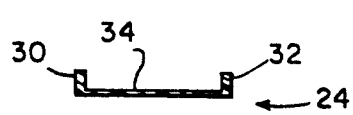

5,150,927

1

EXPANDABLE SEAL ARRANGEMENT

BACKGROUND AND SUMMARY OF THE INVENTION

The present invention relates to a radially expandable seal arrangement and, more specifically, to an arrangement for radially expanding a tubular gasket into compressive sealing engagement with the wall of an opening.

The arrangement described below is an improvement upon the invention described in my previously issued U.S. Pat. No. 4,478,437. To the extent necessary for a full and complete understanding of the present invention, the disclosure of U.S. Pat. No. 4,478,437 is incorporated herein by this reference thereto.

In U.S. Pat. No. 4,478,437, an arrangement for sealing a tubular gasket against the wall of an opening in a manhole riser is described. That arrangement includes a radially expandable split sleeve (28) coaxially received within the gasket adjacent the portion of the gasket which is to be expanded. The sleeve, which is shown in additional detail in FIGS. 3-11 of that patent, is expanded (along with the gasket) by use of a scissors-shaped tool (70) which is operated by a hydraulic cylinder (78) operatively connected between the scissor arms of the tool. Two pins are provided on the distal ends of the arms. These pins are inserted into two openings in opposing ends of the split sleeve, and hydraulic pressure is used to expand the sleeve and gasket until the sleeve ends lock in the expanded position.

The arrangement described in U.S. Pat. No. 4,478,437 works well for its intended purpose. However, a relatively strong force must be exerted by the hydraulic tool in order to expand the compression sleeve and gasket into the final locked position. An object of the present invention is to provide an improved arrangement wherein the magnitude of the force required to expand the sleeve into its final locked position is reduced. This allows a corresponding reduction in the size and weight of the tooling used for installation of the gasket, and for greater equalization of the compression forces applied to the gasket.

Another object of the present invention is to provide an alternative arrangement for locking a split sleeve in the expanded position. This alternative arrangement provides a range of locking positions which enable a single sleeve to be used for openings having a relatively wide range of diameters. The resulting "standardization" in sleeve length and structure allows for substantial reductions in sleeve production costs.

These and other objects of the invention are achieved in an arrangement for radially expanding a tubular gasket which comprises a sliding sleeve, a compression sleeve, means for expanding the sliding sleeve, compression sleeve and tubular gasket from a relaxed position into an expanded position, and means for locking the compression sleeve in the expanded position. The sliding sleeve is formed of a thin membrane of relatively rigid material, such as nylon, hypalon or polyester. The sleeve is positioned adjacent an inner surface of that portion of the tubular gasket to be expanded. The compression sleeve formed of a relatively stiff, but resiliently flexible material is disposed immediately adjacent the sliding sleeve such that the sliding sleeve serves as a slip plate for the compression sleeve when the sleeves are expanded against the inner surface of the tubular gasket. In one embodiment, the sliding sleeve is formed in a U-channel shape, and is dimensioned so as to accept the compression sleeve within the upstanding sidewalls of the U-shaped cross-section. The thickness of the upstanding sidewalls is substantially greater than the wall thickness of the remaining portion of the sliding sleeve. The thin portion of the sliding sleeve is designed to stretch or break when the compression sleeve, sliding sleeve and gasket are expanded. If necessary, the sliding sleeve may be segmented into portions (such as by perforations) which break apart when the sliding sleeve is expanded.

The sliding sleeve may be adapted to fit within a groove formed in the inner surface of the tubular gasket, alternatively, the sliding sleeve may be attached to or molded into the inner surface of the tubular gasket. The sliding sleeve may be attached to the outer surface of the compression sleeve.

The sliding sleeve of the present invention may be used with a compression sleeve such as that shown in U.S. Pat. No. 4,478,437. Alternatively, a compression sleeve which locks in a plurality of expanded positions may be used. One embodiment of such a compression sleeve includes a plurality of inwardly projecting teeth on a first end of the sleeve, and at least one tooth engaging surface on a second opposing end of the sleeve which may engage any one of the plurality of inwardly projecting teeth to lock the sleeve in a corresponding plurality of expanded positions. The second end of the sleeve is formed to include a recess to receive one or more of the plurality of teeth so as to maintain a relatively smooth and continuous profile around the outer circumference of the sleeve.

In another embodiment, the compression sleeve comprises a C-shaped structure and a separate, arc-shaped locking mechanism which engages the ends of the C-shaped sleeve so as to lock the sleeve in an expanded position, and so as to form a relatively smooth and continuous profile around the outer circumference of the compression sleeve/locking mechanism assembly. In this arrangement, teeth-like structures may be provided on opposing ends of the C-shaped sleeve. Mating teeth-like structures are similarly provided on the arc-shaped element to engage the teeth-like structures on the opposing ends of the sleeve to secure the sleeve into an expanded and locked position. The arc-shaped element may be molded into the gasket (or otherwise pre-attached to the inner surface of the gasket) for ease of use and installation.

In either embodiment of the sleeve, a pair of tabs may be provided to engage an appropriate tool for expanding the sleeve and gasket into position. The tabs may be designed to fail when a predetermined amount of force is applied thereto in order to limit the magnitude of the force which may be applied to the sleeve/gasket assembly.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective, partially cut-away and sectioned view of a seal installation constructed in accordance with the principles of the present invention.

FIG. 2 is a front view of the sliding sleeve of the present invention.

FIG. 3 is a cross-sectional view taken along line 3—3 of FIG. 2.

FIG. 4 is a side view of the sliding sleeve of FIG. 2.

DETAILED DESCRIPTION OF THE DRAWINGS

Figure 5:
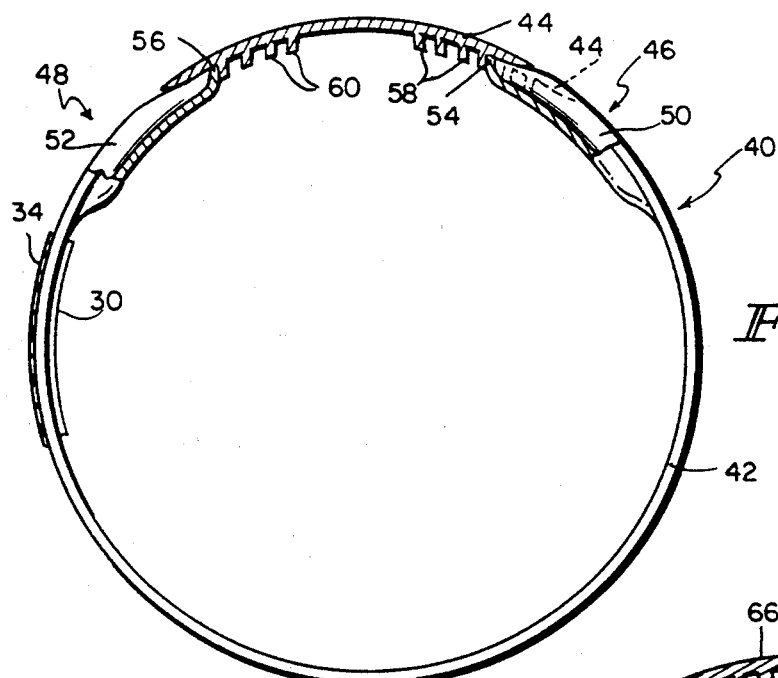
FIG. 5 is a front view, partially cut away, of a compression sleeve suitable for use with the present invention.

Referring to the drawings, FIG. 1 shows a reinforced concrete manhole riser or monolithic base, generally indicated by reference numeral 10, which is provided with a pipe-receiving opening 12 in a sidewall thereof. A pipe 14 is received within opening 12 and extends to a position beyond inner surface 15 of manhole riser or base 10. To seal pipe 14 within hole 12, a gasket apparatus is employed which includes an elongate sleeve 16 of resilient, elastomeric material, such as rubber, neoprene or a suitable plastic. A conventional screw-type, annular clamping band (or bands) 18 is provided on one end of gasket 16 to clamp the gasket against the outer surface of pipe 14. At the opposing end of the gasket, a radially expandable, split sleeve 20 is coaxially received within gasket 16, and is expandable between a first relaxed position into a second expanded position. When sleeve 20 is expanded to its second expanded position, portion 22 of gasket 16, which lies radially adjacent sleeve 20, is sealingly compressed against the wall of opening 12, as previously described in U.S. Pat. No. 4,478,437.

An additional component in the arrangement shown in FIG. 1 which is not found in the arrangement disclosed in U.S. Pat. No. 4,478,437 is sliding sleeve 24. Sleeve 24 is an annular structure disposed adjacent an inner surface of portion 22 of gasket 16, and immediately adjacent the outer circumferential surface of compression sleeve 20. Sleeve 24 is expandable with compression sleeve 20 from a first relaxed position into a second expanded position, as described in more detail below. Sliding sleeve 24 is formed of a thin membrane of relatively rigid material, such as Nylon, Hypalon, or polyester. By virtue of its position and composition, sleeve 24 serves as a slip plate for compression sleeve 20 when the sleeves and gasket are expanded into the second expanded position. This arrangement significantly lowers the magnitude of the force required to expand compression sleeve 20 due to the fact that the coefficients of friction between compression sleeve 20 and sliding sleeve 24 and gasket 16 and sliding sleeve 24 are substantially lower than the coefficient of friction between compression sleeve 20 and gasket 16. This also allows greater equalization of compression of the material in gasket 16, thus effecting a more positive seal between portion 22 and opening 12.

FIG. 2 shows a front view of sliding sleeve 24. Sleeve 24 is generally circular in shape and extends a full 360° around its circumference. In an alternative embodiment, portion 26, which is approximately located between the break lines 28, may be omitted in the area of the locking mechanism on compression sleeve 20, as is shown in FIG. 1.

FIG. 3 shows a cross-section of sliding sleeve 24 taken along line 3—3 of FIG. 2. This embodiment of sleeve 24 is a U-shaped channel having relatively thick upstanding sidewalls 30 and 32, and a relatively thin connecting wall 34. The width of connecting wall 34 (i.e., the space between sidewalls 30 and 32) is dimensioned so as to receive compression sleeve 20 within sidewalls 30 and 32. Additionally, the thickness of upstanding sidewalls 30 and 32 is substantially greater than the wall thickness of connecting portion 34.

FIG. 4 shows a side-view of sliding sleeve 24. As illustrated at multiple locations 36, connecting wall 34 of sleeve 24 may be perforated or otherwise weakened to allow sleeve 24 to stretch, break, or otherwise expand as the compression sleeve is moved from a relaxed position into an expanded and locked position.

Sliding sleeve 24 may be hand-positioned within gasket 16 or, alternatively, may be molded or otherwise adhered into position during an appropriate point in the gasket manufacturing process. Adhesives 37 could be applied as shown, for example, in FIG. 4. Sleeve 24 may also be pre-fitted onto compression sleeve 20. However, since sleeve 24 serves as a slip plate for compression sleeve 20, the use of adhesives or other materials between sleeve 20 and sleeve 24 is generally not preferred.

Gasket 16 is installed in the same general manner as is described in U.S. Pat. No. 4,478,437, except for the additional step of providing sliding sleeve 24 between compression sleeve 20 and gasket 16. As noted, provision of sleeve 24 substantially decreases the magnitude of the force required to expand compression sleeve 20 into the locked position.

FIG. 5 shows a front view of an alternative form of compression sleeve 40 suitable for use in a seal arrangement constructed in accordance with the present invention. Compression sleeve 40 is formed of a resiliently flexible material, such as metal or plastic. The embodiment of compression sleeve 40 illustrated in FIG. 5 comprises a first C-shaped portion 42 and a separate locking mechanism 44. Respective end portions 46 and 48 of portion 42 are formed to provide recesses 50 and 52 for reasons which will be discussed below. At the distal end of each recess are generally outwardly extending raised surfaces 54 and 56, respectively. Surfaces 54 and 56 engage respective ones of a plurality of inwardly projecting teeth formed on the underside of locking portion 44 to lock compression sleeve 40 in one of a plurality of expanded positions.

The arrangement illustrated in FIG. 5 shows compression sleeve 40 expanded and locked in its maximally diametrical expanded position. Sleeve 40 may be readjusted to any one of several positions by positioning surfaces 54/56 adjacent different ones of the plurality of teeth 58/60, respectively. When positioned for a smaller diametrical position. The outermost teeth (i.e., the teeth which are distal from the tooth which engages surface 54 or 56) are received within recesses 50 or 52, as shown by dashed lines. This arrangement allows for maintaining a relatively smooth and continuous profile around the entire outer circumference of compression sleeve 40.

An advantage to the structure depicted in FIG. 5 is that locking portion 44 may be molded into, or otherwise adhered (e.g., by glue), to the interior surface of gasket 16 prior to the time of installation of the gasket in the opening. In such an arrangement, sliding sleeve 24 would extend around portion 42 of compression sleeve 40, and would preferably not extend into the arc-shaped area occupied by locking portion 44. As previously mentioned, sliding sleeve 24 may also be molded into gasket 16 (along with locking portion 44 to simplify assembly and installation of the seal arrangement.

Figure 6:
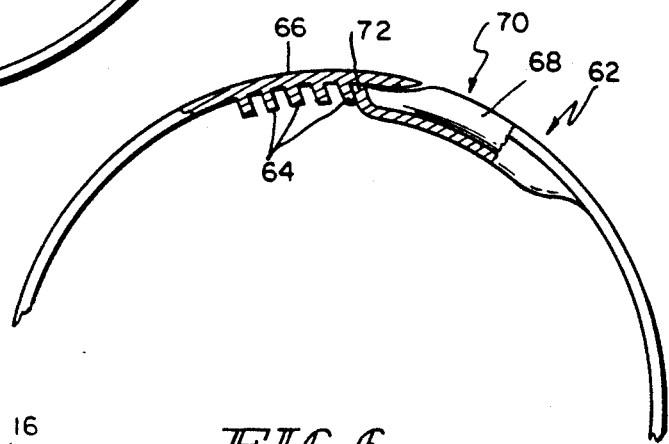
FIG. 6 is a front view of an alternative embodiment of the compression sleeve shown in FIG. 5.

An alternative embodiment of the locking ring of FIG. 5 is shown in FIG. 6. Compression sleeve 62 is similar to sleeve 40, except that sleeve 62 is formed of a continuous strip of resiliently flexible material. A plurality of inwardly projecting teeth 64 are formed on a first end 66 of sleeve 62, while a tooth receiving recess 68 is formed on an opposing end 70 of ring 62. Surface 72 engages one of the teeth 64 to lock sleeve 62 into an expanded position.

Figure 7:
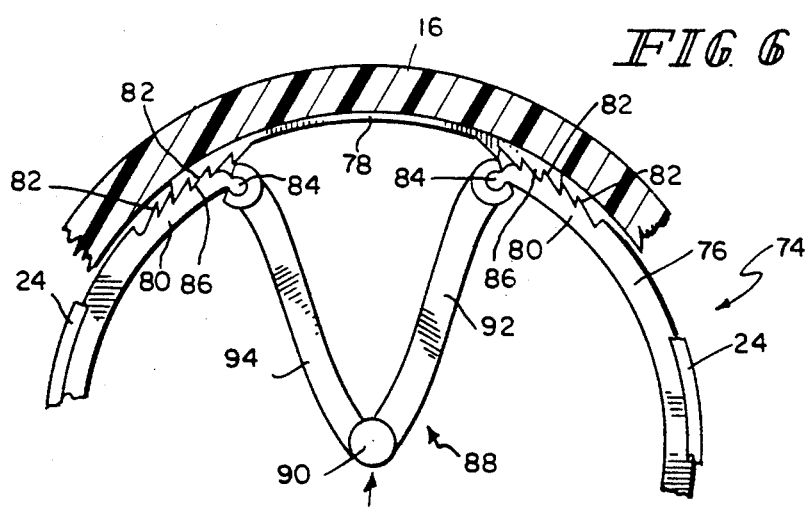
FIG. 7 is a sectional view of an arrangement which utilizes yet another alternative embodiment of the compression sleeve.

FIG. 7 shows yet another embodiment of a compression sleeve 74 which comprises a C-shaped portion 76 and a separate locking portion 78. Ends 80 of sleeve 76 are similarly formed and include a plurality of serrations or outwardly projecting teeth 82, and a pair of tabs 84, as illustrated. Locking portion 78 is an arc shaped member which is provided with inwardly projecting serrations or teeth 86 on opposing ends thereof. Teeth 86 are intended to engage or mate with teeth 82 to lock sleeve 74 in an expanded position. As with the embodiment of FIG. 55, locking portion 78 may be molded or glued to elastomeric gasket 16 as is illustrated in FIG. 7. Portion 76 is then positioned so as to allow teeth 82 and 86 to engage. Compression sleeve 74 may, thus, be adjustably expanded into a plurality of positions and secured in those positions by the engaging teeth.

Also illustrated in FIG. 7 is a hinged tool 88 which may be used to apply an expanding force to portion 76 of sleeve 74. Tool 88 is hinged at 90, and includes a pair of arms 92 and 94 which engage tabs 84 on ends 80 of sleeve 74. A force F applied to the hinge 90 by, for example, a hydraulic jack will cause portion 76 to expand. As this expansion occurs, corresponding sets of teeth engage to maintain portion 76 in the expanded condition. If desired, tabs 84 may be designed to fail when a predetermined force F is applied to tool 88 so that the proper compression force may be more easily achieved in each installation. Sliding sleeve 24 may, of course, also be used in this arrangement, as illustrated.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A compression sleeve capable of transmitting an outwardly, radially directed force to an inner surface of a tubular gasket for radially expanding the tubular gasket into compressive sealing engagement with the wall of an opening, comprising a first portion formed as a continuous strip of resiliently flexible material which comprises means for expanding said first portion from a first relaxed position to at least one expanded position, and a second portion for locking the first portion in said at least one expanded position, said first portion comprising a C-shaped strip of material having an outer circumference which defines more than 180 degrees, but less than 360 degrees, of the compression sleeve in the expanded position.

2. A compression sleeve according to claim 1, wherein said second portion is molded into, or otherwise pre-attached to an inner surface of the tubular gasket.

3. A compression sleeve according to claim 1, wherein said first and second portions are formed such that the first portion can be locked into a plurality of expanded positions, so as to allow the compression sleeve to be used within a range of gasket and opening sizes.

4. A compression sleeve according to claim 1, wherein said compression sleeve comprises a C-shaped strip of material having teeth-like structures on opposing ends thereof, and wherein said means for locking the compression sleeve comprises an arc-shaped structure adapted to engage the teeth-like structures on the opposing ends of the compression sleeve to secure the C-shaped compression sleeve into a locked position.

5. An arrangement for radially expanding a tubular gasket into compressive sealing engagement with the wall of an opening, comprising:
a sliding sleeve, adapted for positioning adjacent an inner surface of that portion of the tubular gasket to be expanded, said sliding sleeve being weakened, such as by perforations, at selected locations so as to allow the sleeve to stretch, break or otherwise deform at said locations as the sleeve is expanded from a relaxed position into an expanded position;
a compression sleeve formed of a relatively stiff but resiliently flexible material and being expandable from a first relaxed position into a second expanded position, said compression sleeve being adapted for disposition immediately adjacent said sliding sleeve such that said sliding sleeve serves as a slip plate for the compression sleeve when the sleeves are expanded into the second expanded position;
means for expanding the tubular gasket, the sliding sleeve, and the compression sleeve from the first relaxed position into the second expanded position such that an outer surface of the tubular gasket engages the wall of the opening; and
means for locking the compression sleeve in the second expanded position.

6. An arrangement according to claim 5, wherein said sliding sleeve is formed of a thin membrane of relatively rigid material.

7. An arrangement according to claim 5, wherein said sliding sleeve is molded into the inner surface of the tubular gasket.

8. An arrangement according to claim 5, wherein said sliding sleeve is attached to an outer surface of the compression sleeve.

9. An arrangement according to claim 5, wherein said compression sleeve comprises a C-shaped structure, and wherein said means for locking the compression sleeve comprises an arc-shaped structure which engages the C-shaped compression sleeve so as to form a relatively smooth and continuous profile around the outer circumference of the compression sleeve/locking means assembly.

10. An arrangement according to claim 9, wherein said arc-shaped structure is molded into, or otherwise attached to, the inner surface of the gasket.

11. An arrangement for radially expanding a tubular gasket into compressive sealing engagement with the wall of an opening, comprising:
a sliding sleeve, adapted for positioning adjacent an inner surface of that portion of the tubular gasket to be expanded, said sliding sleeve being expandable from a first relaxed position into a second expanded position;

a compression sleeve formed of a relatively stiff but resiliently flexible material and being expandable from a first relaxed position into a second expanded position, said compression sleeve being adapted for disposition immediately adjacent said sliding sleeve such that said sliding sleeve serves as a slip plate for the compression sleeve when the sleeves are expanded into the second expanded position;

means for expanding the tubular gasket, the sliding sleeve, and the compression sleeve from the first relaxed position into the second expanded position such that an outer surface of the tubular gasket engages the wall of the opening; and means for locking the compression sleeve in the second expanded position;

wherein said sliding sleeve is segmented into portions which break apart when the sliding sleeve is expanded into the second expanded position.

12. An arrangement for radially expanding a tubular gasket into compressive sealing engagement with the wall of an opening, comprising:

a sliding sleeve, adapted for positioning adjacent an inner surface of that portion of the tubular gasket to be expanded, said sliding sleeve being expandable from a first relaxed position into a second expanded position;

a compression sleeve formed of a relatively stiff but resiliently flexible material and being expandable from a first relaxed position into a second expanded position, said compression sleeve being adapted for disposition immediately adjacent said sliding sleeve such that said sliding sleeve serves as a slip plate for the compression sleeve when the sleeves are expanded into the second expanded position;

means for expanding the tubular gasket, the sliding sleeve, and the compression sleeve from the first relaxed position into the second expanded position such that an outer surface of the tubular gasket engages the wall of the opening; and means for locking the compression sleeve in the second expanded position;

wherein said means for locking the compression sleeve is molded into, or otherwise attached to, the inner surface of the gasket.

13. An arrangement for radially expanding a tubular gasket into compressive sealing engagement with the wall of an opening, comprising:

a sliding sleeve and a compression sleeve, said sliding sleeve being formed of a material which has a lower coefficient of sliding friction when in contact with the compression sleeve than does the tubular gasket, said sliding sleeve being adapted for positioning adjacent an inner surface of that portion of the tubular gasket to be expanded, said sliding sleeve being expandable from a first relaxed position into a second expanded position, and said sliding sleeve being formed so as to be plastically deformable as it is expanded into the second expanded position;

said compression sleeve being formed of a relatively stiff but resiliently flexible material capable of transmitting an outwardly directed force to the inner surface of the tubular gasket and being expandable from a first relaxed position into a second expanded position, said compression sleeve being adapted for disposition immediately adjacent said sliding sleeve such that said sliding sleeve serves as a slip plate for the compression sleeve when the sleeves are expanded into the second expanded position;

means for expanding the tubular gasket, the sliding sleeve, and the compression sleeve from the first relaxed position into the second expanded position such that an outer surface of the tubular gasket engages the wall of the opening, wherein said sliding sleeve is plastically deformed so as to create and maintain a low friction slip plate between the compression sleeve and the inner surface of the tubular gasket as the gasket is expanded into sealing engagement with the wall of the opening;

means for locking the compression sleeve in the second expanded position; and means on said compression sleeve for engaging said means for expanding the compression sleeve; and wherein said means for engaging the means for expanding the compression sleeve is designed to fail when a predetermined amount of force is applied thereto by the means for expanding the compression sleeve.

14. An arrangement according to claim 13, wherein said means for engaging the means for expanding the compression sleeve comprises tabs formed in opposing ends of the compression sleeve.

15. An arrangement for radially expanding a tubular gasket into compressive sealing engagement with the wall of an opening, comprising:

a sliding sleeve, adapted for positioning adjacent an inner surface of that portion of the tubular gasket to be expanded, said sliding sleeve being expandable from a first relaxed position into a second expanded position;

a compression sleeve formed of a relatively stiff but resiliently flexible material and being expandable from a first relaxed position into a second expanded position, said compression sleeve being adapted for disposition immediately adjacent said sliding sleeve such that said sliding sleeve serves as a slip plate for the compression sleeve when the sleeves are expanded into the second expanded position;

means for expanding the tubular gasket, the sliding sleeve, and the compression sleeve from the first relaxed position into the second expanded position such that an outer surface of the tubular gasket engages the wall of the opening; and means for locking the compression sleeve in the second expanded position;

wherein said compression sleeve comprises a C-shaped structure, and wherein said means for locking the compression sleeve comprises an arc-shaped structure which engages the C-shaped compression sleeve so as to form a relatively smooth and continuous profile around the outer circumference of the compression sleeve/locking means assembly; and wherein said arc-shaped structure is molded into, or otherwise attached to, the inner surface of the gasket.

16. An arrangement for radially expanding a tubular gasket into compressive sealing engagement with the wall of an opening, comprising:

a sliding sleeve, adapted for positioning adjacent an inner surface of that portion of the tubular gasket to be expanded, said sliding sleeve being expandable from a first relaxed position into a second expanded position;

a compression sleeve formed of a relatively stiff but resiliently flexible material and being expandable from a first relaxed position into a second expanded position, said compression sleeve being adapted for disposition immediately adjacent said sliding sleeve such that said sliding sleeve serves as a slip plate for the compression sleeve when the sleeves are expanded into the second expanded position;

means for expanding the tubular gasket, the sliding sleeve, and the compression sleeve from the first relaxed position into the second expanded position such that an outer surface of the tubular gasket engages the wall of the opening; and means for locking the compression sleeve in the second expanded position; and wherein said compression sleeve comprises a C-shaped strip of material having teeth-like structures on opposing ends thereof, and wherein said means for locking the compression sleeve comprises an arc-shaped structure adapted to engage the teeth-like structures on the opposing ends of the compression sleeve to secure the C-shaped compression sleeve into a locked position.

17. An arrangement according to claim 16, wherein said arc-shaped structure is molded into, or otherwise attached to, the inner surface of the gasket.

18. In an arrangement for radially expanding a tubular gasket into compressive sealing engagement with the wall of an opening by means of a compression sleeve positioned within the gasket, the improvement comprising a sliding sleeve, adapted for positioning adjacent an inner surface of that portion of the tubular gasket to be expanded and adjacent an outer circumferential surface of the compression sleeve, such that said sliding sleeve serves as a slip plate for the compression sleeve when the sleeves and gasket are expanded from a relaxed position into an expanded position, said sliding sleeve being weakened, such as by perforations, at selected locations so as to allow the sleeve to stretch, break or otherwise deform at said locations as the sleeve is expanded from the relaxed position into the expanded position.

* * * * *